(12) United States Patent
Sagan

(10) Patent No.: US 12,346,397 B2
(45) Date of Patent: Jul. 1, 2025

(54) METHOD AND DEVICE FOR ACCESSING A WEB PAGE AND METHOD AND DEVICE FOR GENERATING A GRAPHIC CODE FOR ACCESSING A WEB PAGE

(71) Applicant: ADVANCED TRACK & TRACE, Rueil-Malmaison (FR)

(72) Inventor: Zbigniew Sagan, Rueil-Malmaison (FR)

(*) Notice: Subject to any disclaimer, the term of this patent is extended or adjusted under 35 U.S.C. 154(b) by 23 days.

(21) Appl. No.: 18/249,546

(22) PCT Filed: Oct. 18, 2021

(86) PCT No.: PCT/EP2021/078858
§ 371 (c)(1),
(2) Date: Apr. 19, 2023

(87) PCT Pub. No.: WO2022/084269
PCT Pub. Date: Apr. 28, 2022

(65) Prior Publication Data
US 2023/0385357 A1 Nov. 30, 2023

(30) Foreign Application Priority Data
Oct. 19, 2020 (FR) .................. FR2010691

(51) Int. Cl.
*G06K 9/36* (2006.01)
*G06F 16/955* (2019.01)
*G06K 7/14* (2006.01)

(52) U.S. Cl.
CPC ....... *G06F 16/9554* (2019.01); *G06K 7/1417* (2013.01)

(58) Field of Classification Search
CPC ............. G06F 16/9535; G06F 16/9554; G06F 16/955; G06F 16/951; G06F 16/972;
(Continued)

(56) References Cited

U.S. PATENT DOCUMENTS

| | | | |
|---|---|---|---|
| 6,772,139 B1* | 8/2004 | Smith, III | G06F 16/748 |
| | | | 707/999.102 |
| 2003/0173405 A1* | 9/2003 | Wilz, Sr. | G06Q 30/02 |
| | | | 235/462.01 |

(Continued)

FOREIGN PATENT DOCUMENTS

| | | | | |
|---|---|---|---|---|
| DE | 202012011209 U1 | 8/2013 | | |
| DE | 202012011209 | * | 7/2023 | ........... G06F 16/955 |

OTHER PUBLICATIONS

The QR code (Year: 2021).*
ISR; European Patent Office; NL; Jan. 20, 2022.
"QR code—wikipidia"—Oct. 17, 2020.

*Primary Examiner* — Daniel S T Cyr
(74) *Attorney, Agent, or Firm* — Patshegen IP; Moshe Pinchas

(57) ABSTRACT

The method (10) for accessing a web page, which method comprises:
- a step (12) of reading a two-dimensional graphic code and of extracting from the code read at least one alphanumeric character representative of the domain name of the page to be accessed;
- a step (14) of changing the system for representing each said alphanumeric character, to encode it in a system increasing the number of symbols required to represent a character;
- a step (16) of adding a prefix and an extension to the code to form a domain address; and
- a step (18) of accessing the domain having this address.

9 Claims, 3 Drawing Sheets

(58) Field of Classification Search
CPC ......... G06K 7/10722; G06K 19/06028; G06K 7/1417; G06K 19/06037
USPC .................................. 235/462.1, 462.09
See application file for complete search history.

(56) References Cited

U.S. PATENT DOCUMENTS

| | | | | |
|---|---|---|---|---|
| 2011/0119263 | A1* | 5/2011 | Hamada | G06F 16/951 |
| | | | | 707/726 |
| 2018/0013720 | A1* | 1/2018 | Sachdev | G06Q 30/00 |
| 2019/0361877 | A1* | 11/2019 | Rogynskyy | G06Q 10/1095 |
| 2020/0013075 | A1* | 1/2020 | Gilmore | G06F 16/9035 |
| 2022/0103525 | A1* | 3/2022 | Shribman | G06F 16/9574 |

* cited by examiner

METHOD AND DEVICE FOR ACCESSING A WEB PAGE AND METHOD AND DEVICE FOR GENERATING A GRAPHIC CODE FOR ACCESSING A WEB PAGE

TECHNICAL FIELD OF THE INVENTION

The present invention relates to a method and a device for accessing a web page, and a method and device for generating a graphic code providing access to a web page.

It applies, in particular, to QR codes (registered trademark) and Data Matrix (registered trademark) codes, which are also used as a means for expressing Visible Electronic Stamp ("VES") type data structures.

STATE OF THE ART

The data volume of a two-dimensional (2D) code, for example a QR code or a Data Matrix, has a strong influence on its dimensions. One extra character above the number of characters that can be represented by such a standardised code—for example 21×21 modules, 60, illustrated in FIG. 4 and able to represent 10 to 25 characters—makes it necessary to use a code with greater dimensions—for example 25×25 modules, 62, illustrated in FIG. 5 and able to represent 20 to 47 characters.

However, domain names require a large number of characters. For example, "https://at2.fr" requires 14 characters. But the shortest domain names are no longer available, especially for the most popular extensions such as ".com". The coding of newly reserved domain names and the electronic addresses of pages in sites using these domain names therefore becomes incompatible with the use of the smallest dimensions of 2D codes.

The Visible Electronic Stamps have the same difficulties of use.

PRESENTATION OF THE INVENTION

The present invention aims to remedy all or part of these drawbacks.

To this end, the present invention envisions, according to a first aspect, a method for accessing a web page, which method comprises:
- a step of reading a two-dimensional graphic code and of extracting from the code read at least one alphanumeric character representative of the domain name of the page to be accessed;
- a step of changing the system for representing each said alphanumeric character, to encode it in a system increasing the number of symbols required to represent a character;
- a step of adding a prefix and an extension to the code to form a domain address; and
- a step of accessing the domain having this address.

Thanks to these provisions, for example by using the binary system, on their own the two characters "AB" represented by the 2D graphic code give access to the domain name "10000011000010". As this domain name has a large number of characters, in this case 16, and is not very readable or memorable, it is generally available.

In some embodiments, during the addition step, the added extension is predefined.

For example, this extension is ".eu", ".fr" or ".com".

In some embodiments, during the addition step, the added extension is encoded in a character of the graphic code read.

For example, the characters "A", "B" and "F" give access to the site 10000011000010.fr and the characters "A", "B" and "D" give access to 10000011000010.de.

In some embodiments, during the system change step, the destination system is one of the hexadecimal, decimal, octal or binary systems.

In some embodiments, the method also comprises a step of connecting, from the domain reached during the access step, to another domain. The server hosting the domain reached therefore simply acts as a gateway, for example to the domain of the one that generates or requests the generation of the 2D graphic code.

According to a second aspect, the present invention envisions a method for generating a 2D graphic code providing access to a web page, which method comprises:
- a step of changing the system for representing characters of the domain name, to encode it in a system representing all the alphanumeric characters; and
- a step of encoding alphanumeric characters in the 2D graphic code.

In some embodiments, the generation method also comprises a step of reserving a domain name for which all the characters are in a hexadecimal, decimal, octal or binary representation system.

According to a third aspect, the present invention envisions a device for accessing a web page, which device comprises:
- a means for reading a two-dimensional graphic code and of extracting from the code read at least one alphanumeric character representative of the domain name of the page to be accessed;
- a means for changing the system for representing each said alphanumeric character, to encode it in a system increasing the number of symbols required to represent a character;
- a means for adding a prefix and an extension to the code to form a domain address;
- a means for accessing the domain having this address.

According to a fourth aspect, the present invention envisions a device for generating a 2D graphic code providing access to a web page, which device comprises:
- a means for changing the system for representing characters of the domain name, to encode it in a system representing all the alphanumeric characters; and
- a means for encoding alphanumeric characters in the 2D graphic code.

As the advantages, aims and characteristics of this generation method, this access device and this generation device are similar to those of the access method that is the subject of the present invention, they are not repeated here.

BRIEF DESCRIPTION OF THE FIGURES

Other advantages, aims and particular features of the invention will become apparent from the non-limiting description that follows of at least one particular embodiment of the method and the device that are the subjects of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Note that the figures are not to scale.

Figure 1:
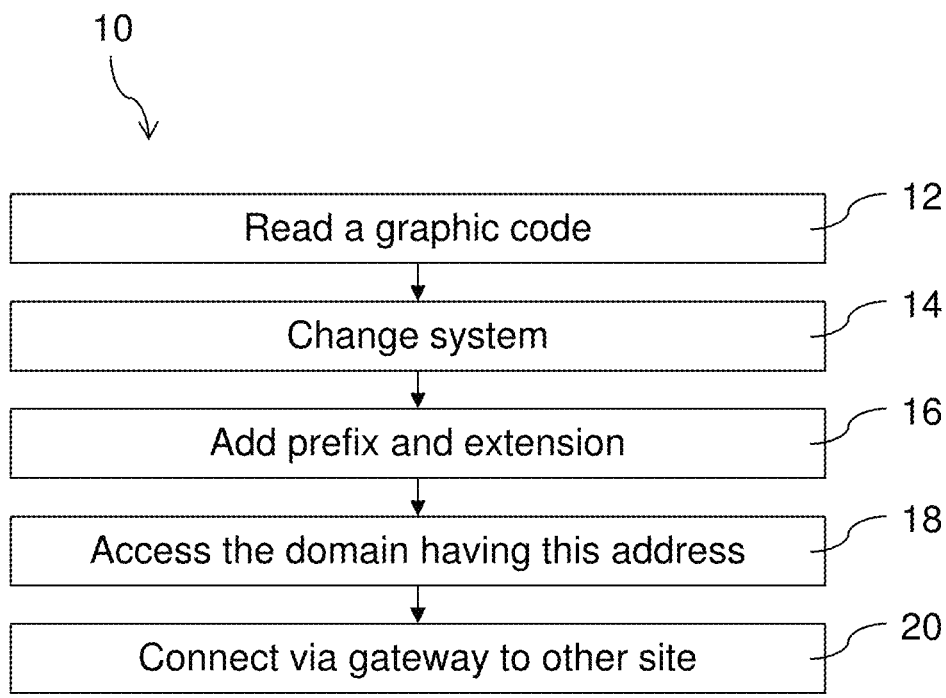
FIG. 1 represents, in the form of a logical diagram, steps utilised in the method for accessing a web page that is the subject of the invention.

FIG. 1 shows a method 10 for accessing a web page, which method comprises:
- a step 12 of reading a two-dimensional graphic code and of extracting from the code read at least one alphanumeric character representative of the domain name of the page to be accessed;
- a step 14 of changing the system for representing each said alphanumeric character, to encode it in a system increasing the number of symbols required to represent a character;
- a step 16 of adding a prefix and an extension to the code to form a domain address; and
- a step 18 of accessing the domain having this address, according to known techniques.

Correspondences between the different systems are indicated below:

Binary-octal base-decimal base-hexadecimal base-glyph 1000001-101-65-41-A 1000010-102-66-42-B In this way, according to the invention, the glyph "A" can be encoded, for example, as:

"41"

"65"

"101" or

"1000001".

Of course, the binary system is the one that can handle the use of domain names having the most symbols, therefore the least reserved domain names.

Preferably, during the system change step 14, the destination system is one of the hexadecimal, decimal, octal or binary systems, and, even more preferably, the binary system.

Moreover, the binary system gives sequences of symbols that are especially difficult to memorise, which increases the chances that they are not reserved.

According to a second example, two glyphs, "AB", are encoded, for example, as:

"4142"

"6566"

"101102" or

"10000011000010".

To perform steps 14 and 16, for a single 2D graphic code, a private application hosted on a terminal, in particular a communicating mobile terminal, or reader transforms the value read, for example the glyph or the hexadecimal value, into a binary chain, adding a prefix and an extension: thus, the characters "AB" correspond to https://10000011000010.fr.

Therefore, two glyphs are sufficient to encode a page address comprising 24 or 25 characters.

In some embodiments, during the addition step 16, the added extension and/or the added prefix are predefined. In the preceding paragraph's example, the prefix is "https://" and the extension is ".fr".

In some embodiments, during the addition step 16, the added extension and/or the added prefix are encoded in a character of the graphic code read. For example, the characters "A", "B" and "F" give access to the site 10000011000010.fr and the characters "A", "B" and "D" give access to 10000011000010.de.

In some embodiments, the method also comprises a step 20 of connecting, from the domain reached during the access step, to another domain. The server hosting the domain reached therefore simply acts as a gateway, for example to the domain of the order giver that generates or requests the generation of the 2D graphic code.

For a 2D code that expresses the VES-type data structure, for example in the data format according to the AFNOR XP Z42-105 standard:

The processing of the bytes corresponding to the Internet address will be defined in the Manifest. Thus, the character "A" is encoded and then completed, for example, as "https://1000001.eu".

Figure 2:
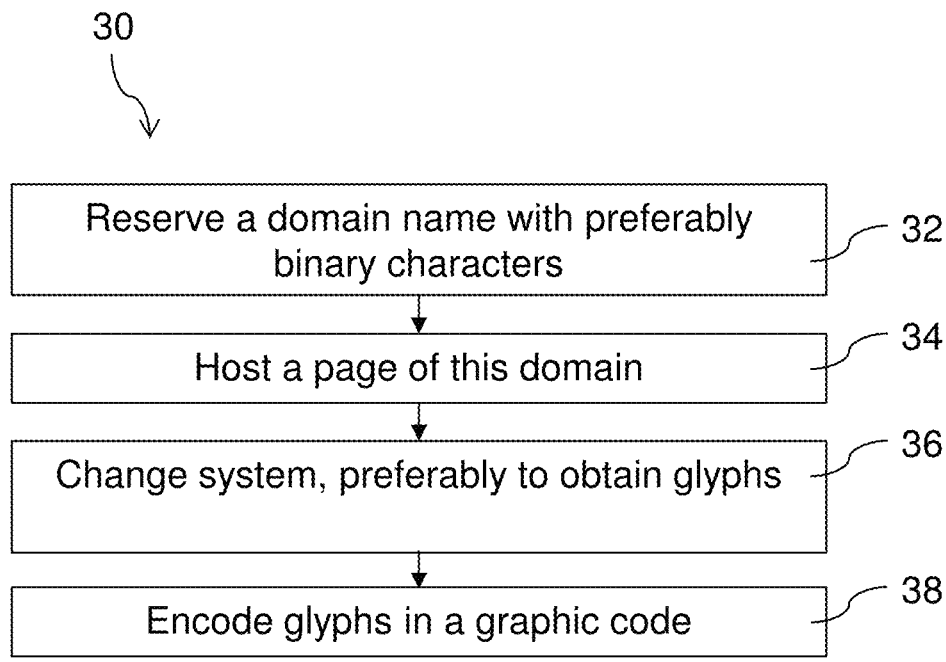
FIG. 2 represents, in the form of a logical diagram, steps utilised in the method for generating 2D graphic codes providing access to a web page that is the subject of the invention.

FIG. 2 shows a method 30 for generating a 2D graphic code providing access to a web page, which method comprises:
- a step 32 of reserving a domain name for which all the characters are in a hexadecimal, decimal, octal or binary representation system;
- a step 34 of hosting a web page on a server that can be accessed via said reserved domain name, or of programming this server so that it acts as a gateway to a web page that the order giver wants to link to this graphic code;
- a step 36 of changing the system for representing characters of the domain name, to encode it in a system representing all the alphanumeric characters; and
- a step 38 of encoding alphanumeric characters in the 2D graphic code.

Figure 3:
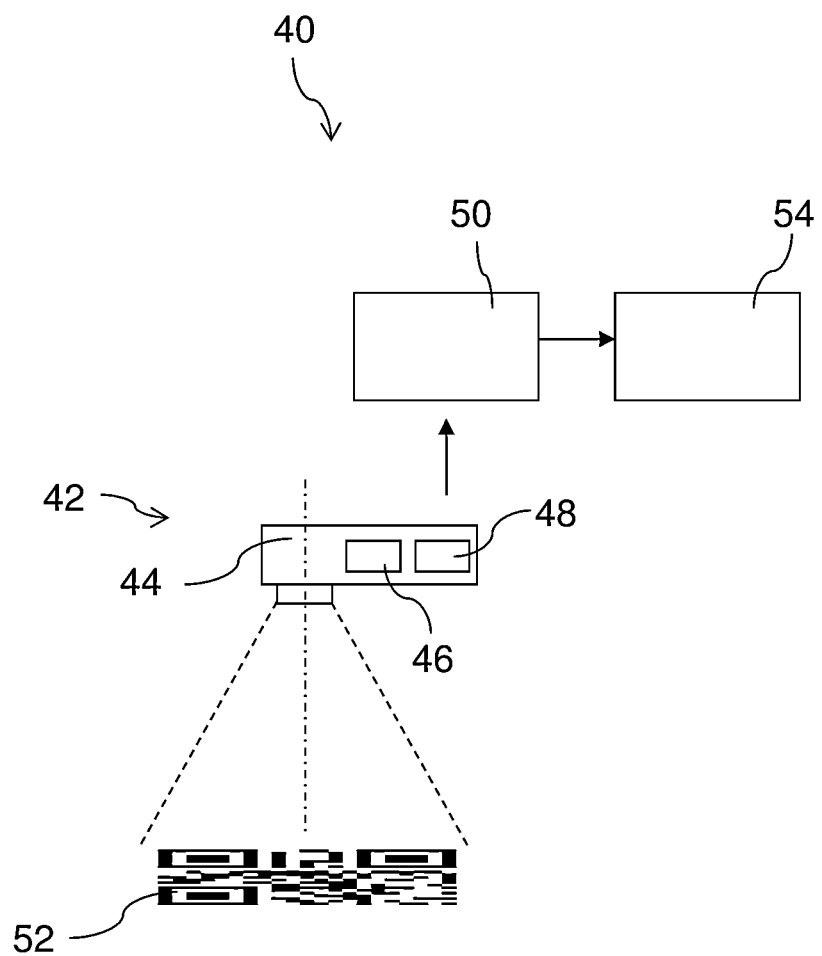
FIG. 3 represents a device for accessing a web page that is the subject of the invention.
Figure 4:
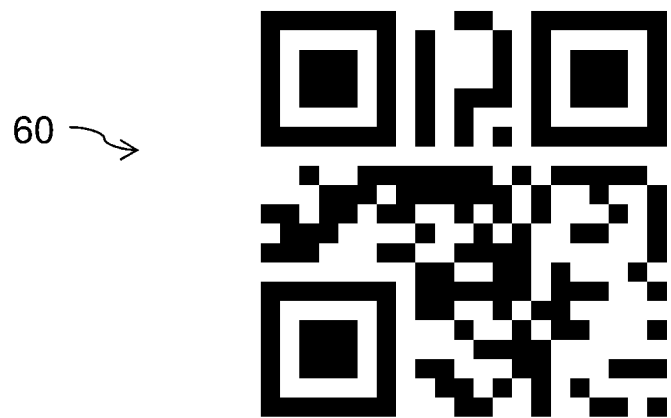
FIG. 4 represents a QR code with 21×21 modules.
Figure 5:
FIG. 5 represents a QR code with 25×25 modules.

An embodiment of the device for accessing a web page is shown in FIG. 3. This device 40 comprises:
- a means 42 for reading a 2D graphic code 52 and of extracting from the code read at least one alphanumeric character representative of the domain name of the page to be accessed, for example a communicating mobile terminal comprising a camera, such as a smartphone 44, equipped with an application 46 for reading graphic codes;
- a means for changing the system for representing each said alphanumeric character, to encode it in a system increasing the number of symbols required to represent a character, for example the reading application 46;
- a means for adding a prefix and an extension to the code to form a domain address, for example the reading application 46;
- a means for accessing the server 50 hosting the domain having this address, for example a web browser 48.

In some embodiments, the server 50 has a gateway function and connects to a server 54 hosting a website under the control of the order giver having generated or requested the generation of the 2D graphic code.

The present invention also envisions a device for generating a 2D graphic code providing access to a web page, which device comprises:
- a means for changing the system for representing characters of the domain name, to encode it in a system representing all the alphanumeric characters, for example a server; and
- a means for encoding alphanumeric characters in the 2D graphic code, for example said server.

The invention claimed is:

1. A method for accessing a web page, which method comprises:
   a step of reading a two-dimensional graphic code;
   a step of extracting from the graphic code at least one alphanumeric character representative of the domain name of the page to be accessed, said at least one alphanumeric character is encoded in a first representation system;
   a step of encoding said at least one alphanumeric character in a second representation system, to form a code, said second representation system is such that the number of symbols required to represent said code in said second representation system is higher than the number of symbols required to represent said alphanumeric character in said first representation system;
   a step of adding a prefix and an extension to the code to form a domain address; and
   a step of accessing the domain having this address.

2. The method according to claim 1, wherein, during the addition step, the added extension is predefined.

3. The method according to claim 1, wherein, during the addition step, the added extension is encoded in a character of the graphic code read.

4. The method according to claim 1, wherein, during the system change step, the destination system is one of the hexadecimal, decimal, octal or binary systems.

5. The method according to claim 1, which also comprises a step of connecting, from the domain reached during the access step, to another domain.

6. The method for generating a 2D graphic code providing access to a web page, which method comprises:
   a step of providing a code representing characters of the domain name, said code is encoded in a second representation system;
      a step of encoding said code in alphanumeric characters in a first representation system, wherein said second representation system is such that the number of symbols required to represent said code in said second representation system is higher than the number of symbols required to represent said alphanumeric character in said first representation system; and
   a step of encoding alphanumeric characters in the 2D graphic code.

7. The method according to claim 6, which also comprises a step of reserving a domain name for which all the characters are in a hexadecimal, decimal, octal or binary representation system.

8. A device for accessing a web page, which device comprises:
   a means for reading a two-dimensional graphic code and of extracting from the graphic code at least one alphanumeric character representative of the domain name of the page to be accessed, said at least one alphanumeric character is encoded in a first representation system;
   a means for encoding said alphanumeric character in a second representation system, to form a code, said second representation system is such that the number of symbols required to represent character said code in said second representation system is higher than the number of symbols required to represent said alphanumeric character in said first representation system;
   a means for adding a prefix and an extension to the code to form a domain address;
   a means for accessing the domain having this address.

9. The device for generating a 2D graphic code providing access to a web page, which device comprises:
   a means for providing a code representing characters of the domain name, said code is encoded in a second representation system;
   a means for encoding said code in alphanumeric characters in a first representation system, wherein said second representation system is such that the number of symbols required to represent said code in said second representation system is higher than the number of symbols required to represent said alphanumeric character in said first representation system; and
   a means for encoding alphanumeric characters in the 2D graphic code.

* * * * *